United States Patent Office  3,026,334
Patented Mar. 20, 1962

3,026,334
PROCESS FOR OBTAINING EPSILON-SUBSTITUTED DERIVATIVES OF CAPROIC ACID AND ITS HOMOLOGUES, AND THE PRODUCTS THEREOF
Francesco Minisci, Milan, Italy, assignor to Montecatini Società General per l'Industria Mineraria e Chimica, Milan, Italy, a corporation of Italy
No Drawing. Filed Jan. 23, 1959, Ser. No. 788,491
Claims priority, application Italy Jan. 28, 1958
16 Claims. (Cl. 260—349)

This application is in part a continuation of my co-pending application Serial No. 734,448, filed May 12, 1958, and subsequently abandoned. That application describes the preparation of a number of epsilon-substituted derivatives of caproic acid from cyclohexanone peroxide, more precisely the chloro- bromo-, iodo-, and cyano-derivatives.

It has now been found that other substances react with peroxides of alicylic ketones such as cyclohexanone peroxide to give new derivatives. For example, by reaction with sodium azide, epsilon-azido-caproic, and by reaction with sulfur dioxide, epsilon-sulfonate-caproic acid are obtained.

Moreover, it has been found that these reactions have a more general character, and are valid for other peroxides obtained by action of hydrogen peroxide on ketones or, in any case, having the structure of oxy-peroxides, namely:

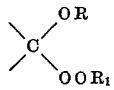

in which R and $R_1$ are the same or different substituents, and represent H or an alkyl or cycloalkyl group.

The present invention relates to the preparation of chloro-, bromo-, iodo-, cyano-, sulfocyano-, dithio-, azido-derivatives and sulfonic acids from a peroxide having the afore-mentioned structure and a hydrohalogenic substance or an alkaline halide, cyanide, sulfocyanide, thiosulfate, azide or sulfur dioxide, for example according to the following scheme:

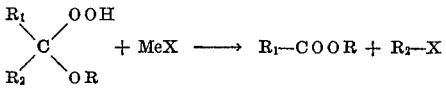

in which $R_1$ and $R_2$ have the afore-mentioned meaning; X is Cl, Br, I, CN, SCN, S—S—$R_2$, $N_3$, $SO_3H$; and Me is an alkali or alkaline earth metal, including ammonium, for example, or is hydrogen preferably where X is halogen.

Where a cyclic peroxide is used, only one product is obtained

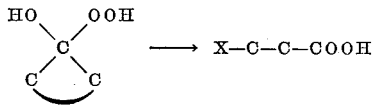

while, in the case of acyclic derivatives, splitting into two products takes place, one of which is always a carboxylic acid, in accordance with the following scheme, in which $R_1$, $R_2$ and X have the afore-mentioned meaning.

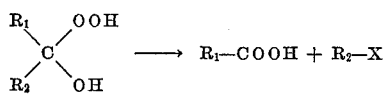

The preferred process according to this invention consists in reacting the peroxide at a temperature of between —20° and +50° C., preferably at between —10° and +10° C., with one of the afore-mentioned reactants, in the presence of substances capable of causing the decomposition of the peroxide into radicals. Typical reducing substances of the kind used in redox systems are used, particularly salts of heavy metals having variable valence, but employed in the form of the lower valence, for example, $Cn^+$ and $Fe^{++}$.

The reaction can be carried out in a single stage, using a suitable solvent for the peroxide. It is, however, preferable to operate in aqueous solution, to improve the yield and to facilitate isolation of the reaction products. In the preparation of halogen derivatives either hydrohalic acids or alkaline halides can be used. The use of the latter does not offer any particular advantage, since at the end of the reaction the solution must be acidified in order to free the reaction products.

The reaction course can be schematized as follows:

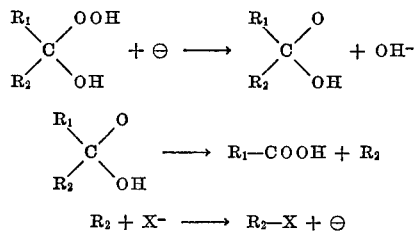

This completely new synthesis makes it possible to obtain, by a rather simple method, products which can hardly be prepared by other methods, and some of which products have not been known till now.

The following examples are illustrative and are not intended to limit the scope of the present invention.

EXAMPLE 1

40 g. cyclopentanone peroxide are added under nitrogen to a solution containing 22 g. cuprous chloride and 24 g. hydrochloric acid in 100 cc. water while stirring. The temperature is kept at 0° to 50° C., and the reaction is completed within half an hour. After decantation of the reaction products, the acid portion, consisting of delta-chloro-valeric acid (19 g.) is separated from the neutral portion, consisting essentially of cyclopentanone (18 g.).

EXAMPLE 2

The preceding example is duplicated, using however 50 g. ferrous sulfate in place of cuprous chloride. Starting with the same amount of peroxide, 17 g. delta-chloro-valeric acid and 22 g. cyclopentanone are obtained.

EXAMPLE 3

11 g. 4-methylcyclohexanone peroxide are added under nitrogen to a solution containing 7 g. cuprous chloride and 5 g. hydrochloric acid in 50 cc. water at 5–10° C., within half an hour while stirring.

After decantation of the organic layer, 3.7 g. of a neutral portion, consisting essentially of 4-methylcyclohexanone and 6 g. of 4-methyl-6-chloro-caproic acid, are separated by treatment with alkalies. The latter acid, not known till now, is a colorless liquid which boils at 127–8° C. under 2 mm.

EXAMPLE 4

The preceding example is duplicated, however, ferrous sulfate is used instead of cuprous chloride and the temperature is kept between 20 and 30° C. 4.5 g. 4-methyl-cyclohexanone and 4 g. of 4-methyl-6-chloro-caproic acid, are obtained.

EXAMPLE 5

20 g. 2-methylcyclohexanone peroxide are added while stirring under nitrogen to a solution containing 10 g. cuprous chloride and 10 g. hydrochloric acid in 60 cc. water within 20-30 minutes, at a temperature of —5° to 0° C.

After decantation of the oily layer, the components of the neutral portion, which essentially consists of 2-methylcyclohexanone (8 g.) and 6-chloroenanthic acid (11 g.), are separated by treatment with alkalies. 6-chloroenanthic acid, i.e. epsilon-chloro-enanthic acid, was not known in the literature until now. It is a colorless liquid which boils at 99° C. under 0.3 mm.

Upon operating under the same conditions but with ferrous sulfate instead of cuprous chloride, practically identical results are obtained.

EXAMPLE 6

15 g. cyclopentanone peroxide are added while stirring to a solution containing 18 g. hydrobromic acid and 10 g. cuprous chloride in 50 cc. water, within 30 minutes, at a temperature of —5 to 0° C. The reaction products are decanted from the aqueous solution and treated with an alkali. The neutral insoluble portion (4.7 g.) is thus separated.

From the alkaline solution after cooling and acidification delta-bromo-valeric acid in the solid state is separated, of which 9 g. (M.P. 38–39° C.) are obtained.

By operating under the same conditions with ferrous sulfate instead of cuprous chloride, 7.2 g. delta-bromovaleric acid are obtained, from the same amount of peroxide.

EXAMPLE 7

33 g. 2-methylcyclohexanone peroxide are added to a solution of 15 g. cuprous chloride and 50 g. hydrobromic acid in 100 cc. water, while stirring under nitrogen within 30 minutes, at —5° C. After decantation of the reaction products, the 2-methylcyclohexanone is separated from the acid fraction by treatment with alkalies. 20 g. 6-bromo-enanthic acid (i.e. epsilon-bromo-enanthic acid) are obtained. It is a colorless liquid, not known until now, which boils at 114° C. under 0.35 mm. pressure.

When using ferrous sulfate as decomposition agent slightly lower yields are obtained.

EXAMPLE 8

15 g. cyclopentanone peroxide are added, while stirring, to a solution containing 10 g. cuprous chloride and 20 g. potassium iodide in 50 cc. water at a temperature of 0–50° C. within 40 minutes. Sulfur dioxide is then bubbled through the solution in order to decolorize same. The decolorized solution is then extracted with chloroform, and the chloroform solution is treated with an aqueous sodium bicarbonate solution. From the aqueous solution 5 g. delta-iodo-valeric acid having a melting point of 55° C. are precipitated by acidification.

EXAMPLE 9

20 g. 2-methylcyclohexanone peroxide are added to a solution containing 10 g. potassium cyanide and 8 g. cuprous cyanide in 30 cc. water. The operation is carried out while stirring at a temperature between 5 and 10° C. within 1 hour. The solution is then filtered, slightly acidified and extracted with ether. The ether is then evaporated and the residue is distilled under reduced pressure; at 138° C. and under 0.8 mm. 0.6 g. epsilon-cyano-enanthic acid are distilled.

EXAMPLE 10

17 g. 1-oxy-1'-hydroperoxy-cyclohexyl-peroxide are added to 12 g. cuprous cyanide, 9 g. potassium cyanide and 100 cc. water while stirring. Temperature 5 to 10° C. When the reaction is completed the undissolved copper salt is filtered off, the oily portion consisting essentially of cyclohexanone (6.2 g.) is separated, acidified and extracted repeatedly with ether. After evaporation of ether, 7.6 g. epsilon-cyano-caproic acid are obtained. Compare Example 25, for a field of utility.

EXAMPLE 11

15 g. cyclopentanone peroxide are added to a solution of 7 g. cuprous sulfocyanide and 14 g. ammonium sulfocyanide in 50 cc. water. Since a vigorous exothermic reaction takes place, the reaction liquid must be highly cooled in order to keep the temperature at between 0° and 5° C. The unreacted cuprous sulfocyanide (6.2 g.) is filtered off and the solution is slightly acidified and extracted with chloroform. The chloroform solution is treated with aqueous sodium bicarbonate. From the resulting aqueous solution 7.2 g. epsilon-sulfocyano-valeric acid are separated by acidification. It is a colorless liquid, boiling at 155° C. under 1 mm., and was not known until now.

EXAMPLE 12

20 g. 2-methylcyclohexanone peroxide are added to a solution of 7 g. cuprous sulfocyanide and 16 g. ammonium sulfocyanide in 50 cc. water while stirring, at —5° C. The mixture is slightly acidified and extracted with chloroform. The chloroform extract is treated with an aqueous sodium bicarbonate solution. By acidifying the latter solution, epsilon-sulfocyanenanthic acid is separated as viscous liquid. This acid was not known until now. It is decomposed by distillation.

EXAMPLE 13

15 g. cyclohexanone are treated with 5.5 g. hydrogen peroxide in ether. The resulting solution is concentrated to a small volume and after standing for 12 hours is added to a suspension of 10 g. CuSCN in a solution containing 17 g. NH$_4$SCN in 100 cc. water while stirring under nitrogen. The temperature is kept at between 0° and 5° C.

When the reaction is completed, the unreacted cuprous sulfocyanide is filtered off, and the filtrate is acidified and the oily layer thus separated is decanted. By means of bicarbonate solution, cyclohexanone (4.3 g.) is separated from epsilon-sulfocyan-caproic acid (16.2 g.). The latter, not known until now, is a liquid boiling at 160° C. under 0.7 mm.

Acidimetric equivalent: found _____ 173.4
Calculated for $C_7H_{11}O_2SN$ _____ 173
N% found _____ 8.01
Calculated _____ 8.09

EXAMPLE 14

22 g. 1-oxy-1'-hydroperoxy-cyclohexyl-peroxide are added, while stirring, to a suspension of 22 g. CuSCN in a solution containing 21.6 g. NH$_4$SCN in 125 cc. water. The temperature is kept at 5–10° C. By operating as in the preceding example 13.7 g. epsilon-sulfocyan-caproic acid and 7.2 g. cyclohexanone are obtained.

EXAMPLE 15

The preceding example is duplicated with the exception that 4.6 g. CuSCN instead of 22 g. are employed. At the end of the reaction 4 g. CuSCN are recovered, and the same results are obtained as in the preceding run.

EXAMPLE 16

22 g. 1-oxy-1'-hydroperoxy-cyclohexyl-peroxide are added to a solution of 30 g. FeSO$_4$·2H$_2$O and 10 g. ammonium sulfocyanide in 100 cc. water while stirring. The temperature was 10–15° C. At the end of the reaction the solution is acidified, the oily layer is separated, and, by means of a bicarbonate solution, 13.5 g. epsilon-sulfocyan-caproic acid and 5.6 g. cyclohexanone are separated.

EXAMPLE 17

30 g. cyclohexanone peroxide are added within 40 minutes while stirring to a solution containing 14 g. sodium azide and 40 g. ferrous sulfate heptahydrate in 100 cc. water. Temperature 0° to 5° C.

When the reaction is completed the mixture is acidified still at a low temperature until the ferric salt precipitate is completely dissolved. The solution is extracted with ether and the ether extract is treated with a bicarbonate solution; by acidifying the latter, epsilon-azido-caproic acid is obtained. It is a colorless liquid, not known until now, which is decomposed by heating or prolonged treatment with acids or alkalies.

By catalytic hydrogenation it yields epsilon-aminocaproic acid.

EXAMPLE 18

30 g. cyclohexanone peroxide are aded, while stirring continuously, to a suspension of 15 g. cuprous oxide, freshly prepared, in a solution of 14 g. sodium azide in 100 cc. water. The temperature was 10–15° C. The reaction proceeds more slowly than in the preceding example and about 2 hours are necessary for completing same. When the reaction is ended, the reaction mixture is acidified while cooling, the insoluble mineral residue is filtered off and the filtrate is extracted with ether. By proceeding as in the preceding example 12 g. epsilon-azido-caproic acid are obtained.

EXAMPLE 19

33 g. cyclopentanone peroxide are added within 30 minutes while stirring to a solution containing 14 g. sodium azide and 40 g. ferrous sulfate heptahydrate in 100 cc. water. The temperature was 0 to 5° C. At the end of the reaction the mixture is acidified at low temperature until the iron salt precipitate is completely dissolved. The solution is extracted with ether and the ether extract is treated with a bicarbonate solution. By acidifying the latter, epsilon-azido-valerianic acid, not known until now, is obtained.

EXAMPLE 20

30 g. cyclohexanone peroxide are added, while stirring, to a solution containing 40 g. ferrous sulfate in 100 cc. water. A slight stream of sulfur dioxide is also introduced, the $SO_2$-excess is then removed, barium hydroxide is added until alkalinity, the barium hydroxide excess is precipitated with $CO_2$ and is filtered. By concentrating the filtrate, the barium salt of epsilon-sulfonate-caproic acid, not known until now, is separated. The alkaline salts of said acid are good detersives, i.e. detergents.

*Analysis.*—Found: C, 21.90%; H, 3.12%; S, 9.72%; Ba, 41.65%. Calculated for $C_6H_{10}O_5SBa$: C, 21.68%; H, 3.02%; S, 9.68%; Ba, 41.44%.

The same result is attained by employing $Cu_2O$ instead of $FeSO_4$.

EXAMPLE 21

13 g. cyclopentanone peroxide are added while agitating to 5 g. $CuSO_4 \cdot 5H_2O$, 24 g. sodium thiosulfate pentahydrate in 100 cc. water. Temperature —5 to 0° C.

At the end of the reaction the neutral portion is separated and strongly acidified with hydrochloric acid; the solution is heated to boiling and then, by cooling, epsilon-epsilon'-dithio-di-valeric acid is separated.

EXAMPLE 22

12 g. 1-oxy-1'-hydroperoxy-cyclohexyl-peroxide are added while stirring to 5 g. $CuSO_4 \cdot 5H_2O$, 24.8 g. $Na_2S_2O_3 \cdot 5H_2O$ in 100 cc. water. The temperature was 15 to 20° C. At the end of the reaction the neutral portion, mainly consisting of cyclohexanone, is separated and the solution is strongly acidified with hydrochloric acid. The solution is then heated to boiling and, after a few minutes, an oil begins to separate which solidifies by cooling. The epsilon-epsilon'-dithio-di-caproic acid, $$HOOC(CH_2)_5-S-S-(CH_2)_5-COOH,$$

crystallized from water, melts at 82° C.

Acidimetric equivalent: Found _____ 148.11
Calculated for $C_{12}H_{22}O_4S_2$ _____ 147.21

The products are obtained according to the present invention can in general be employed as intermediates for obtaining commercial products of a wide use, as it is shown in the following illustrative examples.

EXAMPLE 23

To a solution containing 6 g. cuprous cyanide and 9 g. potassium cyanide in 40 cc. water, 20 g. cyclopentanone peroxide are added while agitating. The temperature is kept at 10 to 15° C.

When the reaction is completed, sodium hydroxide is added and the mixture is refluxed for 1 hour. After filtration and acidification 6 g. adipic acid are obtained.

EXAMPLE 24

30 g. methylethylketone perioxide are added under nitrogen while stirring to a solution of 10 g. cuprous sulfocyanide and 15 g. ammonium sulfocyanide in 60 cc. water. Temperature is kept at 0 to 5° C. during the addition which is completed within 40 minutes. The unreacted cuprous sulfocyanide (9 g.) is filtered off, the solution is acidified and extracted repeatedly with chloroform. The chloroform extract is treated with a sodium carbonate solution and then evaporated; the residue is subjected to fractionation thus obtaining 2 fractions, the first one consisting of methylethylketone, the second one of ethylsulfocyanide: M.P. 142–143° C.

From the alkaline solution of the latter, acetic acid is recovered by acidification.

EXAMPLE 25

The reaction is carried out as in Example 10 but when it is completed, the undissolved copper salt is filtered off, the solution is acidified and boiled for 30 minutes. Pimelic acid (6 g.) is crystallized by cooling.

My copending application Serial No. 734,448 discloses processes for preparing an epsilon-halo-caproic acid, in which the halo substituent is taken from the group consisting of chlorine, bromine, and iodine, comprising treating cyclohexanone peroxide with a member of the group consisting of hydrohalic acids, alkali metal halides, and alkaline earth metal halides in the presence of a redox promoter comprising a heavy metal salt in which the metal is a multivalent metal and is present in a lower valence state, at a temperature of about —20° to +50° C., and contains the following 14 examples:

*Example 1'*

33 g. 1-oxy-1'-hydroperoxy-cyclohexylperoxide are added to 100 cc. water, 25 g. cuprous chloride and 60 g. 36% hydrochloric acid under nitrogen while stirring. The temperature is kept at between 0° and 5° C. The oily layer is decanted and, by treatment with $Na_2CO_3$, 12 grams cyclohexanone and 20 grams epsilon-chloro-caproic acid (melting point 25° C.) are separated.

*Example 2'*

25 g. cyclohexanone are treated overnight with 9 g. hydrogen peroxide in ether at room temperature. The resulting solution is added to 60 cc. water, 40 g. concentrated hydrochloric acid and 20 g. cuprous chloride at a temperature of between —5° C. and 0° C. under nitrogen, while stirring.

The ether layer is separated and, after treatment with $Na_2CO_3$, 27 g. epsilon-chloro-caproic acid and 6 g. cyclohexanone are obtained.

*Example 3'*

33 g. 1-oxy-1'-hydroperoxy-cyclohexylperoxide are added to 100 cc. water, 25 g. cuprous chloride and 30 g. sodium chloride, while stirring at a temperature between 0° and 5° C. When the reaction is completed, the mixture is acidified with sulfuric acid. The oily layer is decanted, from which 18 g. epsilon-chloro-caproic acid and 11 g. cyclohexanone are obtained, by treatment with sodium or potassium hydroxide.

Example 4'

12 g. cuprous oxide are suspended in 100 cc. water in which 18 g. sodium chloride have been dissolved. 20 g. 1-oxy-1'-hydroperoxy-cyclohexylperoxide are then added under nitrogen while stirring. The temperature slowly rises up to 38° C. When the reaction is completed the reaction mixture is acidified, with sulfuric acid for example, and the oily layer is decanted. By treatment with alkali 6.5 g. cyclohexanone and 8.5 g. of an acidic product are obtained. The latter by distillation gives 4 g. caproic acid and 4.2 g. epsilon-chloro-caproic acid.

Example 5'

To a solution of 63 g. $FeSO_4.7H_2O$ and 30 g. NaCl in 200 cc. water, are added 30 g. 1-oxy-1'-hydroperoxy-cyclohexylperoxide under nitrogen while stirring, at a temperature of 5–10° C. The reaction mixture is acidified when the reaction is completed and the oily layer formed is decanted. By treatment with $Na_2CO_3$ 9.5 g. cyclohexanone and 19 g. epsilon-chloro-caproic acid are separated.

Example 6'

14 g. iron powder are treated under nitrogen with 100 cc. 36% hydrochloric acid. To the solution thus obtained 30 g. 1-oxy-1'-hydroperoxy-cyclohexylperoxide are added at a temperature between 35° and 45° C. while stirring. After decantation of the oily layer and treatment with NaOH, 12 g. cyclohexanone and 11 g. epsilon-chloro-caproic acid are separated.

Example 7'

To a mixture of 25 g. cuprous chloride, 150 cc. methyl alcohol and 60 g. 36% hydrochloric acid, 33 g. 1-oxy-1'-hydroperoxy-cyclohexylperoxide dissolved in 300 cc. methanol are added under nitrogen while stirring. The temperature gradually rises to 45° C. Alcohol, water and cyclohexanone are distilled off and the residue is dissolved in water and extracted with ether. By evaporating ether, 8 g. epsilon-chloro-caproic acid are obtained.

Example 8'

33 g. 1-oxy-1'-hydroperoxy-cyclohexylperoxide are added to 18 g. cuprous chloride, 80 g. 40% hydrobromic acid and 100 cc. water under nitrogen while stirring, at a temperature of 0–5° C. The oily layer is decanted and, by treatment with $CaCl_2$, 11.5 g. cyclohexanone and 23.4 g. epsilon-bromo-caproic acid (melting point 36° C.) are obtained.

Example 9'

25 g. cyclohexanone are treated at room temperature overnight with 9 g. hydrogen peroxide in ether; the resulting solution is added to 60 cc. water, 20 g. hydrobromic acid and 18 g. cuprous chloride at a temperature between −5° and 0° C. under nitrogen while stirring. By operating as in the preceding example, 34 g. epsilon-bromo-caproic acid and 7.5 g. cyclohexanone are obtained.

Example 10'

To a mixture of 250 cc. water, 40 g. potassium bromide and 20 g. cuprous chloride, 30 g. 1-oxy-1'-hydroperoxy-cyclohexylperoxide are added under nitrogen while stirring. Temperature is kept at between 25° and 30° C. After acidification when the reaction is completed, the oily layer formed is decanted and, operating as in the preceding example, 20 g. epsilon-bromo-caproic acid and 12 g. cyclohexanone are obtained.

Example 11'

20 g. 1-oxy-1'-hydroperoxy-cyclohexylperoxide are added under nitrogen to a solution of 63 g. $FeSO_4.7H_2O$ and 20 g. hydrobromic acid in 200 cc. water while stirring. The temperature rises up to 45° C. during the addition. The oily layer is decanted and, as in the preceding example, 14.5 g. cyclohexanone and 11.3 g. epsilon-bromo-caproic acid are separated.

Example 12'

25 g. 1-oxy-1'-hydroperoxy-cyclohexylperoxide are added to a mixture of 15 g. cuprous chloride, 25 g. hydroiodic acid in 100 cc. water under nitrogen while stirring, at a temperature in the range of 0–5° C. The separated oil is decanted and, by adding sodium bicarbonate, the acidic portion (14 g.) is separated from cyclohexanone (12 g.). The acid melts at 38–40° C. After crystallization from petroleum ether it melts at 42° C.

Example 13'

24 g. epsilon-bromo-caproic acid and 260 cc. 25% ammonia are kept at room temperature for 6 days in a corked flask. Water and the ammonia excess are distilled off and the solid residue is taken again with boiling ethyl alcohol which dissolves ammonium bromide. The residue has a melting point of 170–175° C. After crystallization from a mixture methanol/ether 10 g. epsilon-amino-caproic acid are obtained. Ammonium bromide is recovered by evaporation of alcohol.

Example 14'

20 g. epsilon-chloro-caproic acid are neutralized with 10% NaOH and refluxed with 8.9 g. potassium cyanide for 5 hours. After cooling and acidification it is repeatedly extracted with ether. By evaporation of ether 14.3 g. epsilon-cyano-caproic acid are obtained.

The di- or poly-carboxylic acids described above also have utility in the preparation of condensation polymers, by reaction with the usual di- or poly-amines, amino acids, and di- or poly-hydroxy compounds. The alkaline salts of the various mono-carboxylic and poly-carboxylic acids described have utility as detergents, wetting agents, etc. The epsilon-cyano groups can be converted by the usual catalytic hydrogenation, to amino groups.

The new process is generally defined as designed to obtain epsilon-substituted derivatives of caproic acid from peroxides, and is characterized in that an oxy-peroxide having the following general formula

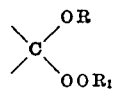

wherein R and $R_1$ are equal or different groups, consisting of H or an alkyl or cycloalkyl, is reacted with a hydrohalic acid or an alkaline halide, cyanide, sulfocyanide, thiosulfate or azide or sulfur dioxide, thus obtaining halogen-, cyano-, sulfocyano-, dithio- or axido-derivatives or sulfonic acids, respectively, and in that the reaction is carried out at between −20° and +50° C., preferably in aqueous solution at between −10° and +10° C., in the presence of substances capable of causing the decomposition of the peroxide into free radicals, in particular the salts of heavy metals having a variable valence, in their lower valence.

I claim:

1. A process of making an omega-azide of an aliphatic carboxylic acid, comprising treating a peroxide of a cycloaliphatic ketone having the linkage

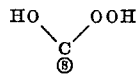

the cycloaliphatic ring S of which is a saturated hydrocarbon ring of five to six ring carbon atoms, said ring having as substituents members of the group consisting of hydrogen and lower alkyl; the treating being with an azide of the class consisting of the alkali group and alkaline earth group azides, in the presence of a redox reducing agent taken from the group consisting of cuprous oxide, and cuprous and ferrous salts at about −20° to +50° C.

2. A process of making an omega-sulfocyanide of an aliphatic carboxylic acid, comprising treating a peroxide of a cycloaliphatic ketone having the linkage

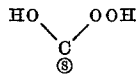

the cycloaliphatic ring S of which is a saturated hydrocarbon ring of five to six carbon atoms, said ring having as substituents members of the group consisting of hydrogen and lower alkyl with a sulfocyanide of the class consisting of the alkali group and alkaline earth group sulfocyanides, in the presence of a redox reducing agent of the group consisting of cuprous oxide, and cuprous and ferrous salts at about —20° to +50° C.

3. The process of claim 2, the sulfocyanide being ammonium sulfocyanide, the redox agent being cuprous sulfocyanide.

4. The process of claim 2, the sulfocyanide being ammonium sulfocyanide, the redox agent being ferrous sulfate.

5. A process of making an omega-dithio-di-carboxylic acid, comprising treating a peroxide of a cycloaliphatic ketone having the linkage

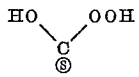

the cycloaliphatic ring S of which is a saturated hydrocarbon ring of five to six ring carbon atoms, said ring having as substituents members of the group consisting of hydrogen and lower alkyl; the treating being with a thiosulfate taken from the class consisting of the alkali group and alkaline earth group thiosulfates, in the presence of a redox reducing agent taken from the group consisting of cuprous oxide, and cuprous and ferrous salts.

6. A process of making an omega-sulfonate of an aliphatic carboxylic acid, comprising reacting a peroxide of a cycloaliphatic ketone having the linkage

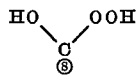

the cycloaliphatic ring S of which is a saturated hydrocarbon ring of five to six ring carbon atoms, said ring having as substituents members of the group consisting of hydrogen and lower alkyl; with sulfur dioxide in the presence of ferrous sulfate.

7. The compound epsilon-azido-caproic acid.

8. The compound epsilon-azido-valerianic acid.

9. The compound epsilon-sulfonate-caproic acid.

10. The process of claim 5, the ketone peroxide being cyclopentanone peroxide, the thiosulfate being sodium thiosulfate, the redox agent being cuprous sulfate.

11. The process of claim 5, the ketone peroxide being cyclohexanone peroxide, the thiosulfate being sodium thiosulfate, the redox agent being cuprous sulfate.

12. The process of claim 1, the ketone being cyclohexanone, the azide being sodium azide.

13. The process of claim 1, the ketone being cyclopentanone, the azide being sodium azide.

14. The process of claim 2, the sulfocyanide being ammonium sulfocyanide.

15. A process of making epsilon-cyano-caproic acid comprising treating 1-oxy - 1' - hydroperoxy - cyclohexylperoxide with cuprous cyanide and potassium cyanide in aqueous medium at —20° to +50° C.

16. A process of making adipic acid, comprising treating cyclopentanone peroxide with cuprous cyanide and potassium cyanide in water at —20° to +50° C. and refluxing the product in aqueous alkali.

References Cited in the file of this patent
UNITED STATES PATENTS

| 2,376,105 | Williams | May 15, 1945 |
| 2,710,302 | Hyson | June 7, 1955 |
| 2,811,551 | Coffman et al. | Oct. 29, 1957 |
| 2,839,576 | Phillips | June 17, 1958 |
| 2,870,201 | Pollack | Jan. 20, 1959 |
| 2,880,220 | Johnston | Mar. 31, 1959 |

OTHER REFERENCES

Nischk: Ann. der Chemie, Vol. 576, pages 232–4 (1952).

Hill: J. Org. Chem. (London), Vol. 19, pages 1802–6 (1954).

Leonard: J. Am. Chem. Soc., Vol. 76, pages 5708–14 (1954).